(12) United States Patent
Lombardo et al.

(10) Patent No.: US 7,896,277 B2
(45) Date of Patent: Mar. 1, 2011

(54) FISHING REEL

(75) Inventors: William Joseph Lombardo, Highland Park, IL (US); Corey Feit, St. Louis, MO (US); Dale Picolet, House Springs, MO (US)

(73) Assignee: William Lombardo, Highland Park, IL (US)

( * ) Notice: Subject to any disclaimer, the term of this patent is extended or adjusted under 35 U.S.C. 154(b) by 51 days.

(21) Appl. No.: 12/462,506

(22) Filed: Aug. 4, 2009

(65) Prior Publication Data
US 2010/0059615 A1  Mar. 11, 2010

Related U.S. Application Data

(60) Provisional application No. 61/137,789, filed on Aug. 4, 2008.

(51) Int. Cl.
*A01K 89/01* (2006.01)
(52) U.S. Cl. .......................... 242/229; 242/255; 242/316
(58) Field of Classification Search .................. 242/229, 242/230, 231, 232, 255, 278, 279, 280, 316
See application file for complete search history.

(56) References Cited

U.S. PATENT DOCUMENTS

| | | | | |
|---|---|---|---|---|
| 2,633,307 A * | 3/1953 | Morgan et al. | | 242/229 |
| 3,004,731 A * | 10/1961 | Mauborgne | | 242/229 |
| 3,425,643 A * | 2/1969 | Lemon | | 242/241 |
| 3,727,857 A * | 4/1973 | Chann | | 242/229 |
| 3,903,635 A * | 9/1975 | Boese | | 242/229 |
| 3,944,159 A * | 3/1976 | Dobbs | | 242/229 |
| 4,019,693 A * | 4/1977 | Lesage | | 242/229 |
| 4,184,651 A * | 1/1980 | McConachy | | 242/229 |
| 4,213,579 A * | 7/1980 | Fox | | 242/255 |
| 4,411,395 A * | 10/1983 | Steffens | | 242/397.1 |
| 4,725,013 A * | 2/1988 | Epperson | | 242/231 |
| 4,927,095 A | 5/1990 | Young | | |
| 5,669,565 A * | 9/1997 | Zurcher et al. | | 242/233 |
| 5,799,889 A * | 9/1998 | Plestan | | 242/231 |
| 6,257,513 B1 * | 7/2001 | Cockerham et al. | | 242/231 |
| 6,446,894 B1 | 9/2002 | Holma et al. | | |
| 6,561,448 B2 * | 5/2003 | Barker | | 242/229 |
| 7,478,774 B2 * | 1/2009 | Chang et al. | | 242/229 |
| 2009/0250540 A1 * | 10/2009 | Bennis | | 242/233 |

OTHER PUBLICATIONS

Old Fishing reels web page printout dated May 12, 2010 identifying "old" Pivoting Spinning Reels.
Abu Garcia Ambassador 1000 bait casting reel schematics printed off Abu Garcia web site on May 12, 2010.

(Continued)

*Primary Examiner* — Emmanuel M Marcelo
(74) *Attorney, Agent, or Firm* — McDonnell Boehnen Hulbert & Berghoff

(57) ABSTRACT

A fishing reel including a spool shaft extending through a reel frame with a handle crank attached thereto with a non-rotating spool collar and spool positioned about the spool shaft, and a rod mount connected to the reel frame pivotable 90 degrees from a first position with respect to the reel frame to a second position. When the rod mount is in the first position, and the handle crank is rotated, the spool oscillates in and out with respect to the reel frame and the spool rotates about the spool collar in a manner such that fishing line positioned on the line guide is spooled onto the spool when being reeled in, and when the rod mount is in the second position, the spool is generally parallel to the rod mount to allow line to be cast out from the spool.

24 Claims, 15 Drawing Sheets

OTHER PUBLICATIONS

Abu Garcia Automatic 170 spin casting reel schematics printed off Abu Garcia web site on May 12, 2010.

Abu Garcia 1000 Series spinning reel schematics printed off Abu Garcia web site on May 12, 2010.

* cited by examiner

US 7,896,277 B2

FISHING REEL

FIELD OF THE INVENTION

The present invention relates to the field of fishing reels in general, and in particular, to a fishing reel having a spool that combines features of a bait casting reel and a spin casting reel, with a rod mount that pivots 90 degrees.

BACKGROUND OF THE INVENTION

For many years, fishermen have used both bait casting fishing reels and spin casting fishing reels, each having certain advantages and disadvantages. In a typical bait casting fishing reel, a spool is rotatably mounted on a spool hub positioned generally perpendicular to the fishing rod as well as the fishing line. The spool hub remains in a fixed position with respect to the reel housing. When reeling in the fishing line, the spool rotates about the spool hub, a line guide is driven to oscillate in and out above the spool and spool hub to evenly distribute the line on the spool as the spool is rotated and takes up line. An advantage of a typical bait casting reel is that during line takeup, the angler is able to maximize the test of the line because the line is taken up at an angle perpendicular to the spool and wound directly onto the spool. Another advantage is that less twist or snarl results in the line because it is fed onto the spool during takeup at an angle of 90 degrees, resulting in fewer line snarls due to less twist in the line, and fewer replacements of the line when it becomes twisted. However, when casting a bait casting fishing reel, given that the line is oriented at 90 degrees from the spool, the spool of the bait casting reel tends to overunwind and create backlash when casting, resulting in more line than necessary unwinding from the spool. As a result, the line may get tangled and create a knot or birds nest of the fishing line which can cause aggravation to the fisherman and require time to unsnarl. Meanwhile, an undesirable slack in the line may cause an angler to delay his retrieve and possibly result in a lost strike, or lost fish. To prevent the overunwinding or backlash of the line during casting, the angler typically monitors the outflow of line and may place a thumb or finger over the line on the spool to apply pressure to the spool in an attempt to avoid backlash. This may serve to reduce the distance a lure may be casted.

A typical spin casting reel, or spinning reel, on the other hand, includes a spool that is rotationally fixed relative to the reel housing and does not rotate. When retrieving the line, the bail housing, bail, and line guide of the bail (bail assembly) are driven to rotate about the rotationally fixed spool and serve to wind the line onto the spool. While the bail assembly rotates, the rotationally fixed spool is oscillated in and out so that the line guide of the bail lays the line down evenly on the spool during line takeup. A disadvantage of the spinning reel mechanism is that with line being wound onto the spool via the rotating bail assembly, with an indirect line takeup, the line tends to twist, eventually resulting in undesirable snarls and more frequent line replacement. With the indirect line takeup used in the spinning reel, the amount of pulling force the angler can apply is reduced, as opposed to a direct pick line pickup. Further, an angler may fear tripping or bending the bail if too much pulling force is applied. Nonetheless, the spinning reel is deemed to have several advantages over bait casting reels when it comes to casting. Because the spool is fixed and does not rotate during the cast, the line comes of the spool more easily and the spinning rod is able to cast the lure farther, particularly when using light lures. Moreover, the backlash often associated with bait casting reels is typically avoided when using the fixed spool of the spinning reel because it does not rotate, and thereby does not overunwind the line which sometimes happens when casting with a bait casting reel.

It is apparent that bait casting reels and spin casting reels each have their advantages and disadvantages. It is desirable to create a fishing reel that operates in certain respects like a bait casting reel when retrieving line and in certain respects like a spinning reel when casting line.

SUMMARY OF THE INVENTION

The present invention is directed to a fishing reel including a reel frame that has a spool shaft extending through the reel frame, a handle crank attached to a first end of the spool shaft with a non-rotating spool collar positioned about the spool shaft, a spool positioned about the spool collar that rotates around the spool collar when the handle crank is rotated, a non-rotating bail connected to the reel frame, a line guide positioned on or adjacent to the non-rotating bail and positioned above the spool, and a rod mount connected to the reel frame pivotable 90 degrees from a first position with respect to the reel frame to a second position. When the rod mount is in the first position, the spool is generally perpendicular to the rod mount, and when the handle crank is rotated, the spool oscillates in and out with respect to the reel frame and the spool rotates about the spool collar in a manner such that fishing line positioned on the line guide is spooled onto the spool in a back and forth manner to spool the fishing line across a length of the spool, and when the rod mount is in the second position, the spool is generally parallel to the rod mount to allow line to be cast out from the spool.

DETAILED DESCRIPTION OF PREFERRED EMBODIMENTS

Figure 1:
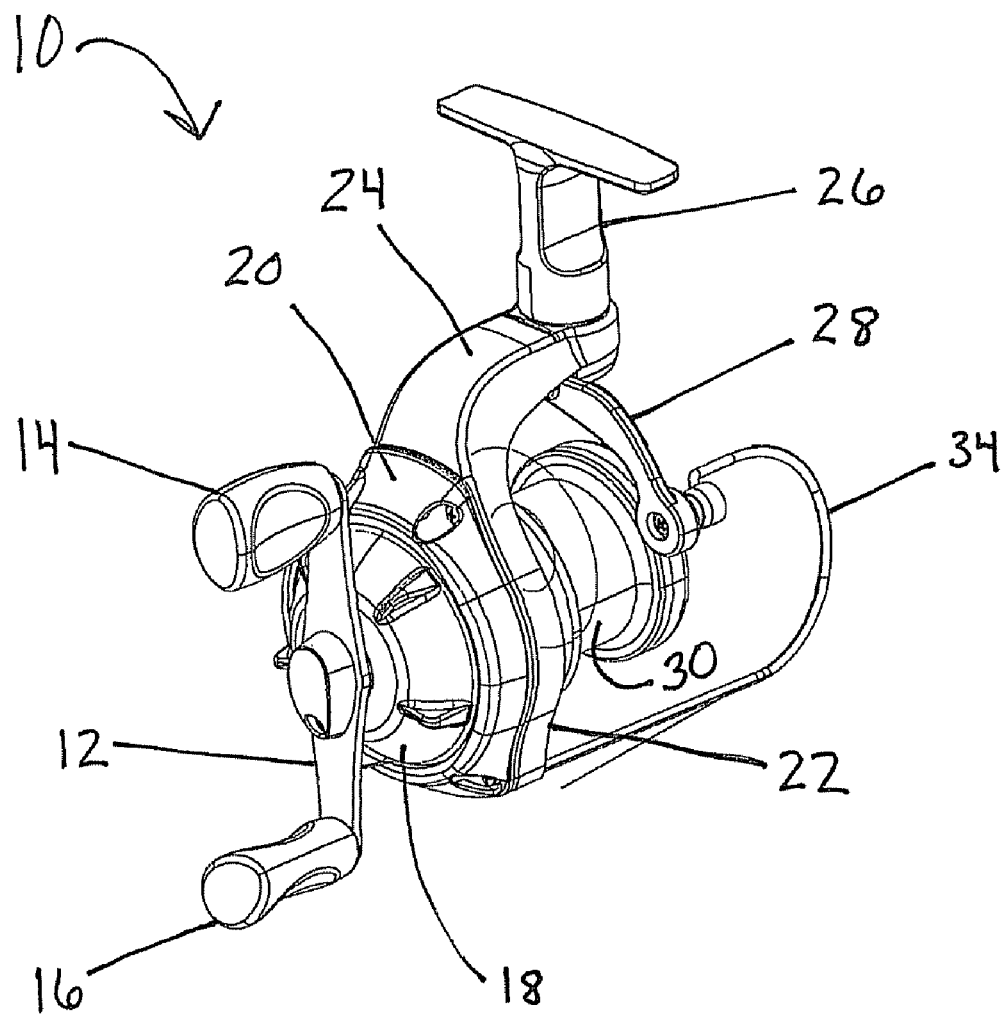
FIG. 1 is a perspective view of an embodiment of a fishing reel.

The present embodiments are illustrated as exemplary embodiments that disclose a fishing reel embodying features of the present inventions. FIG. 1 shows a perspective view of a fishing reel 10 having a handle crank 12 shown to the left with oppositely disposed handle paddles 14 and 16. The paddles are rotatably coupled to the handle crank, and although two paddles are shown, a single offset paddle or even a non-rotating paddle could be used. Also shown is crank 18 and rear cover 20 shown adjacent reel frame 22. Extending from reel frame 22 is reel frame arm 24. A rod mount 26 is pivotably connected to reel frame arm 24. Positioned axially outwardly from the reel frame 22 is spool 30, as well as bail 34 that is connected to the reel frame 22 as well as bail arm 28 that extends inwardly from reel frame arm 24.

Figure 2:
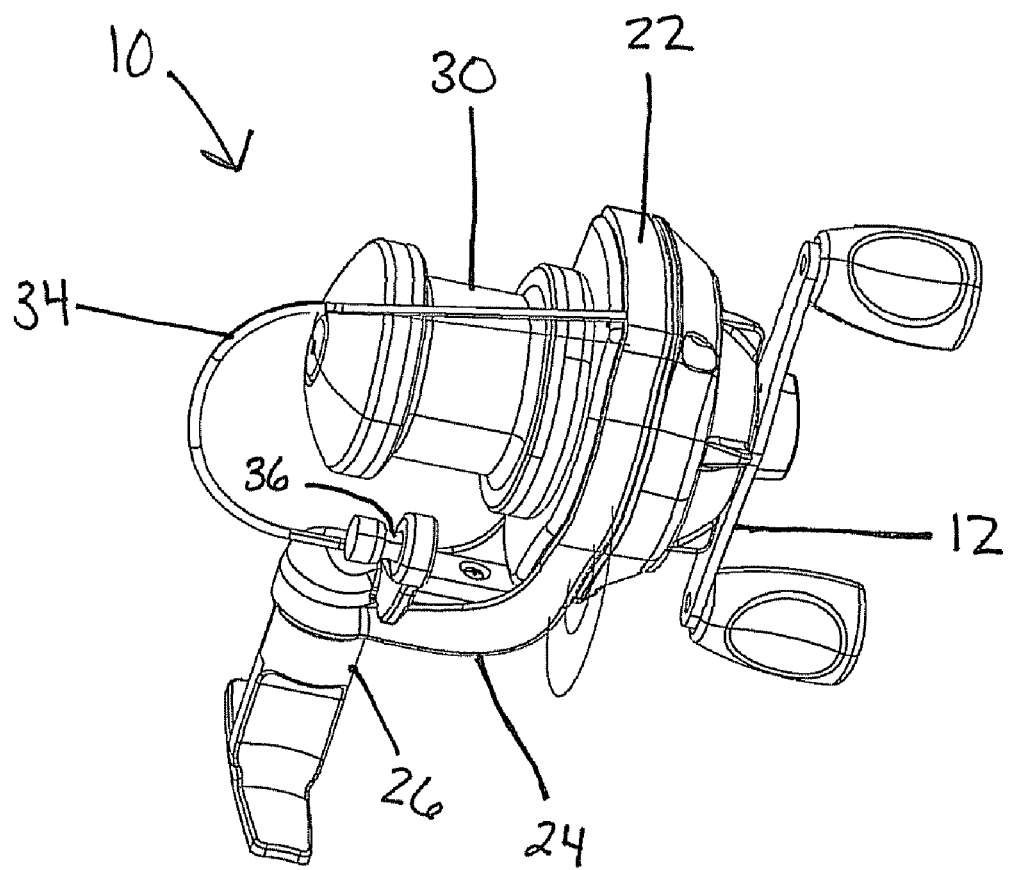
FIG. 2 is another perspective view of the fishing reel shown in FIG. 1.

FIG. 2 shows an alternate perspective view of fishing reel 10 with handle crank 12 shown to the right. Fishing spool 30 is shown positioned radially inwardly of bail 34, while reel frame arm 24 is shown extending outwardly and having a rod mount 26 pivotably connected thereto. Line guide 36 is shown positioned at one end of the bail 34.

Figure 3:
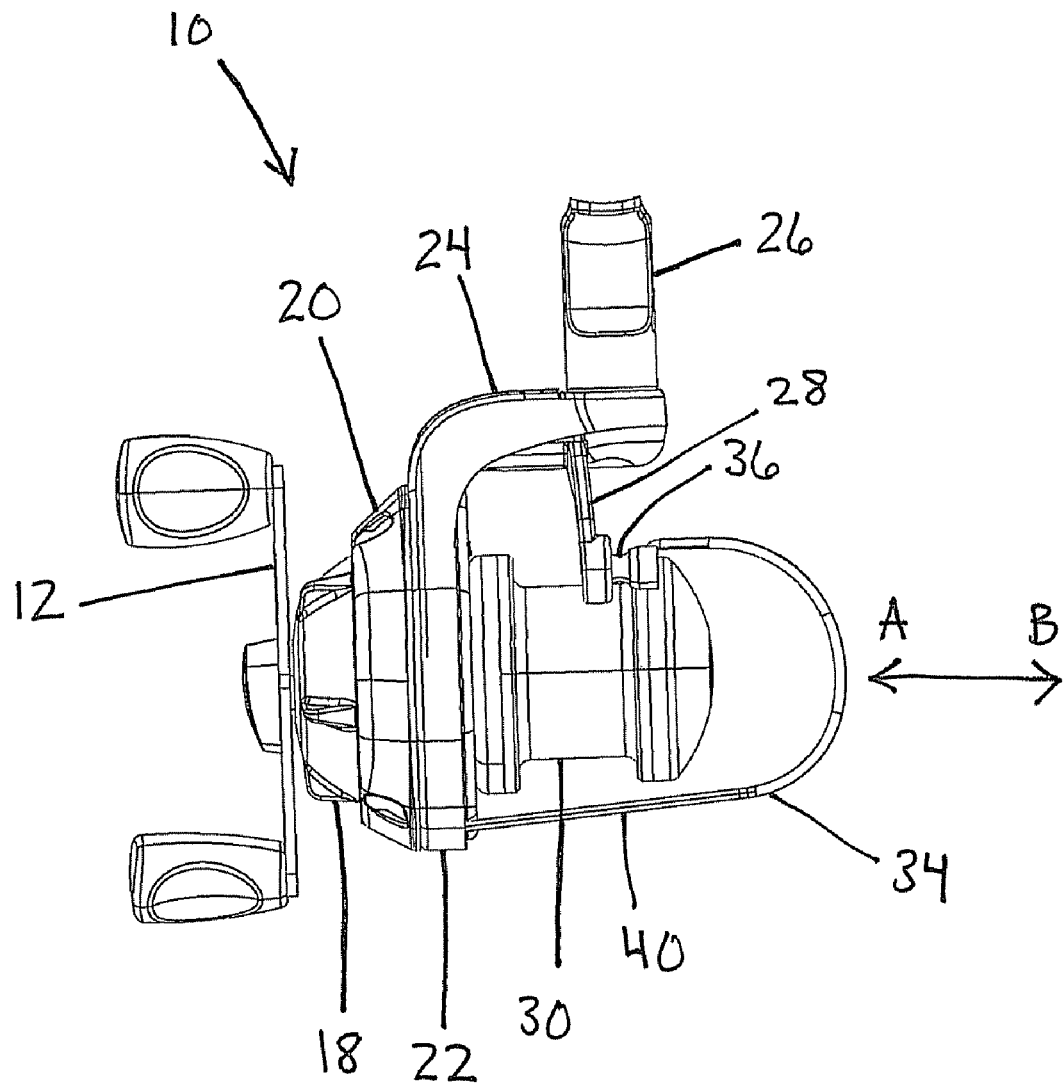
FIG. 3 shows a side view of the fishing reel shown in FIG. 1.

FIG. 3 shows a side view of fishing reel 10 with handle crank 12 extending to the left. Crank cover 18 is shown positioned outwardly from the crank handle 12 and adjacent rear cover 20. Positioned outwardly from rear cover 20 is reel frame 22 that has a reel frame arm 24 extending outwardly where it connects with rod mount 26 that is pivotably connected thereto. Also shown is bail 34 having a line guide 36 positioned at one end of bail 34 and connected to bail arm 28. The bail 34 is positioned radially outwardly from spool 30 at section 40.

In operation, as the handle crank is rotated, the spool collar (not shown) upon which spool 30 is positioned, oscillates from an in position (as shown) in a direction from point A to point B. As the handle crank 12 is rotated, the spool collar and spool are oscillated in and out, or back and forth, from a direction from point A to point B and then in an opposite direction from point B towards point A. At the same time, the spool 30 and spool hub on which it is positioned rotates to spool in the fishing line. The fishing line is guided through stationary line guide 36 to spool the fishing line onto spool 30 in an evenly distributed fashion. As the spool (and spool hub) are oscillated axially, the line is spooled on spool 30 across the axial length of the spool. In this embodiment, the rod mount 26 is shown in a first position with respect to reel frame 22 such to that the spool 30 is essentially perpendicular to the rod mount 26. In this embodiment, when the rod mount is in its first position, the rod mount 26 and fishing rod are both essentially perpendicular to the spool. With this configuration, when the handle crank 12 is rotated, the fishing line is spooled directly onto spool 30 in a perpendicular fashion. This configuration is similar to the line takeup used in conventional bait casting reels. With this configuration, the line test is maximized and the line is less likely to twist and snarl because it is taken up directly onto the spool in a perpendicular manner. However, unlike conventional bait casting reels where the spool does not oscillate, in this embodiment, the spool not only is rotated, but also oscillated in and out at the same time. Therefore, the spool moves rotationally, and also oscillates in and out axially.

The spool 30, reel frame 22, reel frame arm 24, rod mount 26, crank cover 18, rear cover 20, bail arm 28, spool collar (not shown) and spool hub (not shown) are preferably made from a lightweight metal, such as magnesium or aluminum, and could also be made from hard plastic materials.

Figure 4:
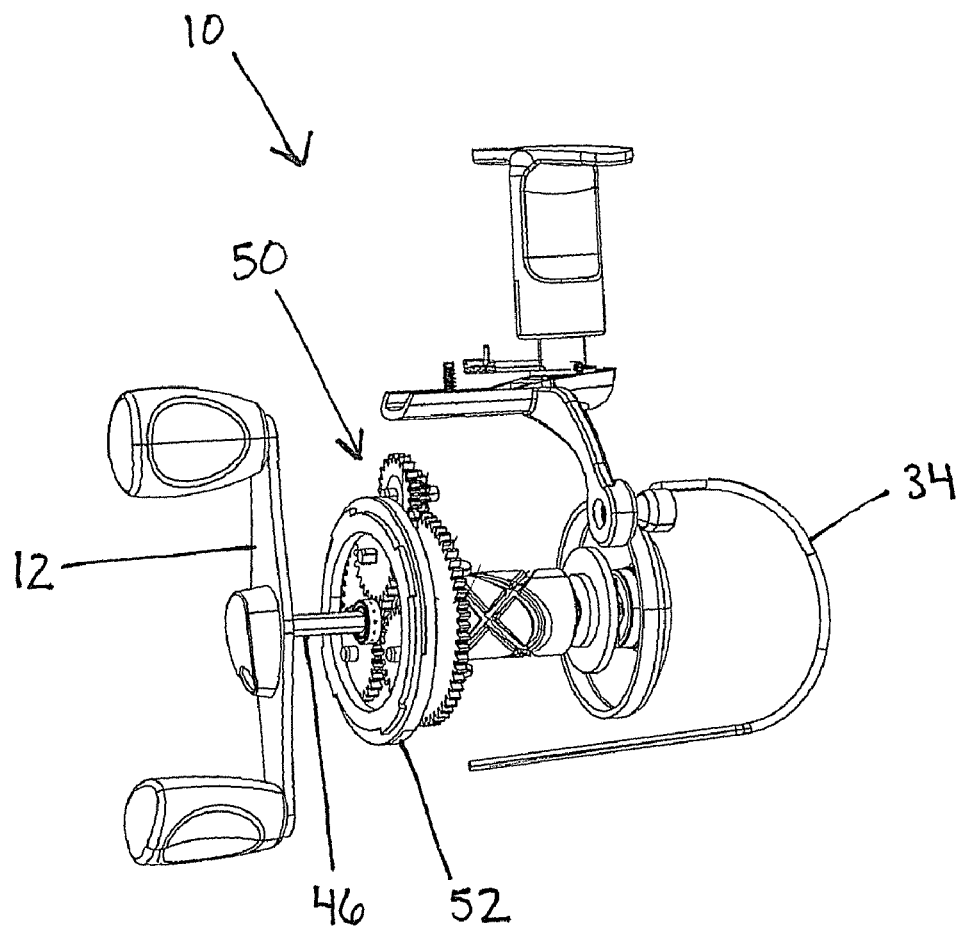
FIG. 4 is a perspective view of a fishing reel where certain portions have been removed to show the internal mechanisms.

FIG. 4 is a perspective view of fishing reel 10 in an embodiment where the spool collar, spool hub, spool, reel frame, crank cover, and rear cover have been removed to reveal the internal mechanisms used to rotate and oscillate the spool. In FIG. 4, the handle crank 12 is shown connected to spool axle 46 which extends through, but is not directly connected to, planetary gear assembly 50. Through rear cover 20 the handle crank 12 imparts rotational motion to a ring gear 52 that has radially inwardly extending teeth (not shown).

Figure 5:
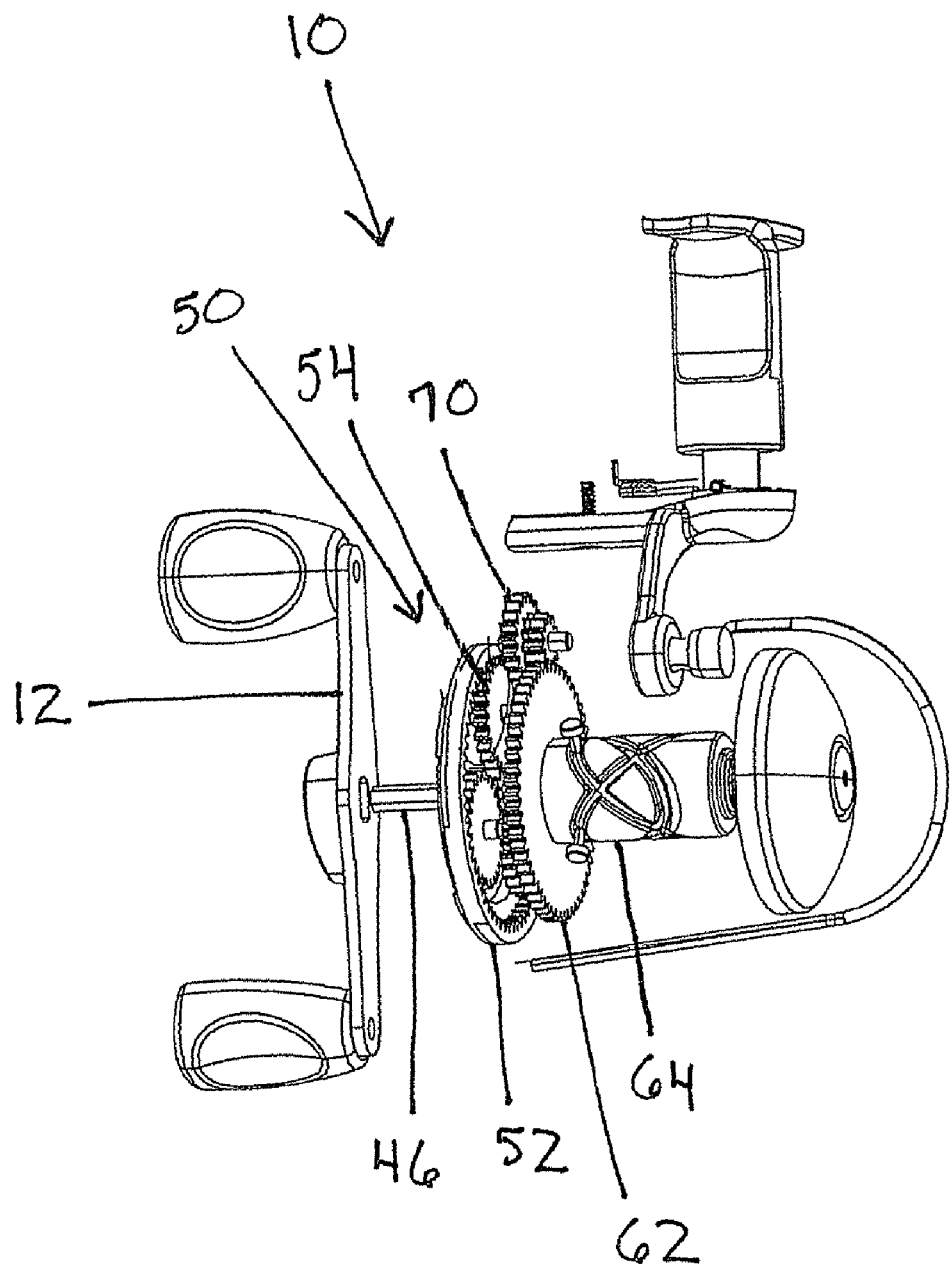
FIG. 5 is another perspective view of the fishing reel shown in FIG. 4.

FIG. 5 is an alternate perspective view of fishing reel 10 also where the spool collar, spool hub, spool, reel frame, crank cover, and rear cover have been removed to reveal the internal mechanisms used to rotate and oscillate the spool. The inwardly extending teeth of ring gear 52 imparts rotational movement to three planet gears including first planet gear 54. Ultimately, rotational motion is imparted to compound gear 70 which directly drives spool hub gear 62 and spool oscillator 64.

Figure 6:
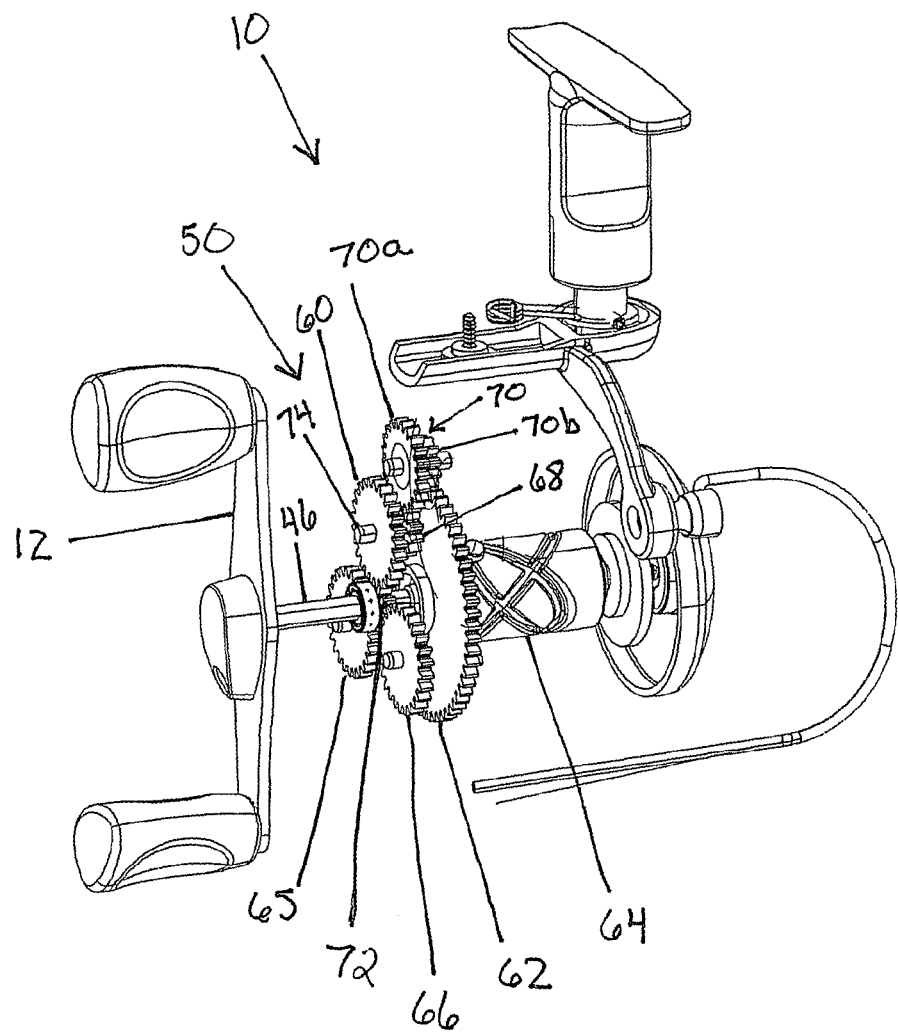
FIG. 6 is another perspective view of the fishing reel shown in FIGS. 4 and 5.

FIG. 6 is another perspective view of fishing reel 10 from a different angle again where the spool collar, spool hub, spool, reel frame, crank cover, and rear cover have been removed to reveal the internal mechanisms used to rotate and oscillate the spool. The handle crank 12 drives spool axle 46 which extends through planetary gear assembly 50 and through spool oscillator 64 ultimately connecting to the spool. As shown in FIG. 6, the ring gear imparts rotational movement to first planet gear 60, second planet gear 65, and third planet gear 66. The three planet gears 60, 65, and 66 in turn drive sun gear 72 which is positioned radially inwardly and in meshing engagement with the three planet gears. While three planet gears are shown, a single planet gear or other gear configurations could also be used to impart rotational force. Further, while the present embodiments show rotational motion imparted axially through the spool shaft, rotational motion could also be provided in an offset manner.

The first planet gear 60 is connected via dowel pin 74 to auxiliary gear 68, preferably having a D-shaped cross-section, thus providing a flat to impart rotation to the auxiliary gear 68. As planetary gear 60 rotates, the auxiliary gear 68 is also caused to rotate. Auxiliary gear 68 has outer teeth that engage the outer teeth of a first set of outer teeth 70a of compound gear 70. Compound gear 70 has a second set of outwardly extending teeth 70b that are located axially outwardly from the first set of outer teeth 70a. The first set of teeth 70a and second set of teeth 70b both rotate in unison because they are both part of compound gear 70. The second set of teeth 70b of compound gear 70 are in meshing engagement with the outer teeth of spool hub gear 62. As compound gear 70 rotates, spool hub gear 62 is driven to rotate. Directly connected to spool hub gear 62 is spool oscillator 64 over which the spool hub and spool (not shown) are positioned. It should be noted that the embodiments thus far described include a spool assembly comprising a spool hub, as well as a spool positioned about the spool hub. However, it is also possible to simply have a spool that is positioned about the spool collar. It is preferably to have a spool assembly having both a spool hub and spool to allow the spool to be easily changed, when for example, a different strength line is desired.

Figure 7:
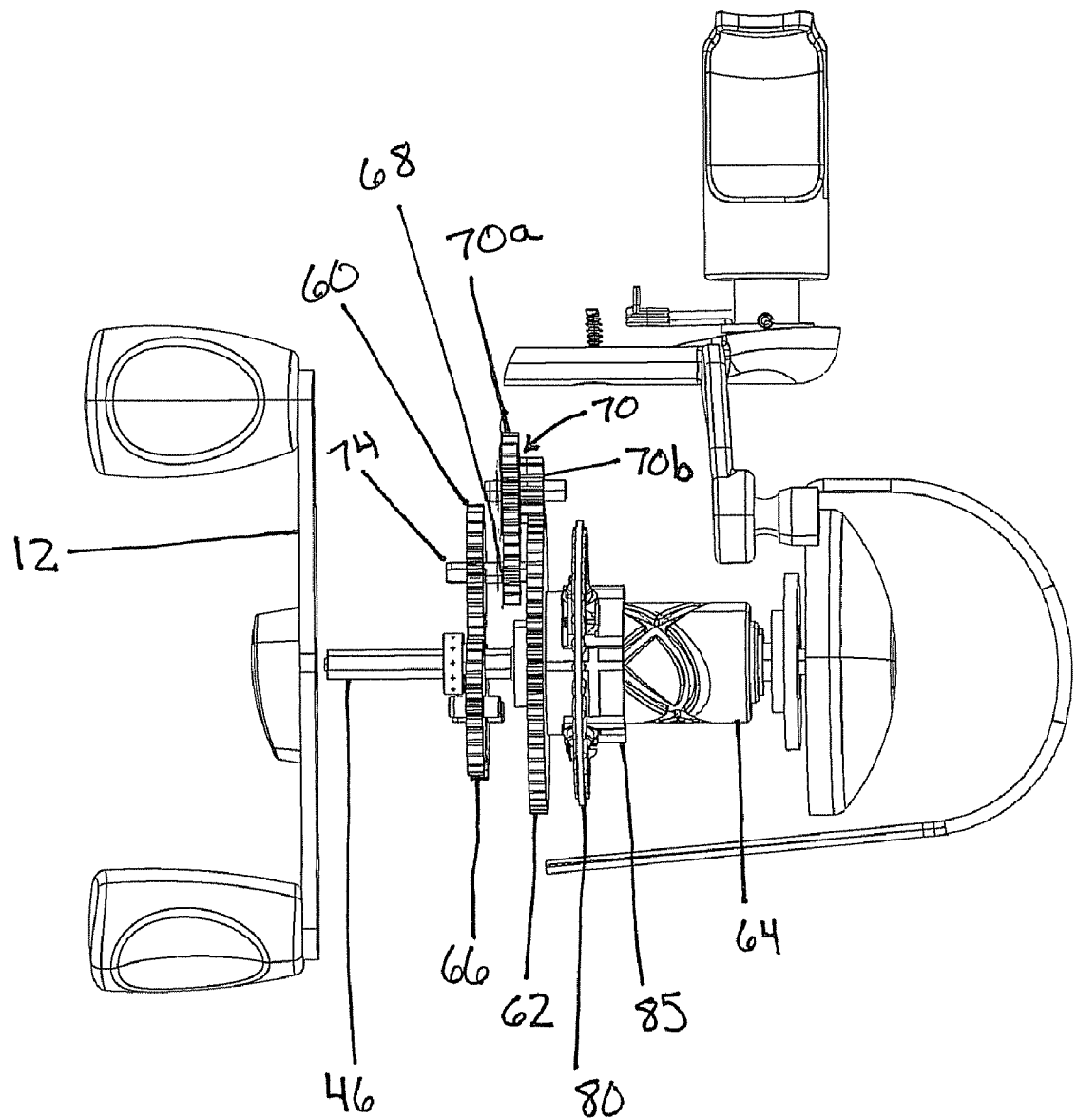
FIG. 7 is a side view of the fishing reel shown in FIG. 3 where certain portions have been removed to show the internal mechanisms.

FIG. 7 is a side view of the fishing reel of FIG. 3 where again the spool hub, spool, reel frame, crank cover, and rear cover have been removed to reveal the internal mechanisms used to rotate and oscillate the spool. FIG. 7 shows that when handle crank 12 is rotated, it imparts rotational force to spool axle 46 and also drives the ring gear that imparts rotational motion to the planet gears, including first planet gear 60 and second planet gear 66. First planet gear 60 is shown connected to auxiliary gear 68 via dowel pin 74. The auxiliary gear 68 drives compound gear 70 by engaging the first set of teeth 70a. The second set of teeth 70b of compound gear 70 in turn drive spool hub gear 62 which is directly connected to spool oscillator 64. As spool hub gear 62 rotates, the spool oscillator 64 also rotates. Further, the spool axle 46 extends through the spool oscillator 64 to provide stability and as a guide for the oscillating spool oscillator 64. Also shown is thrust bearing 80 which is positioned radially outwardly from the spool axle and is positioned in an annular fashion between the reel frame (not shown) and the spool (not shown) to reduce any rotational friction caused by the rotation of the spool and spool hub.

Each of the described planet gears, auxiliary gear, compound gear, ring gear, and spool hub gear may be made from any suitable metal including brass or stainless steel, or even hard plastic material, and are preferably comprised of stainless steel given its corrosion resistance properties In addition, the spool oscillator also may be made from any suitable metal including brass or stainless steel and is preferably made of stainless steel. In addition, while the teeth of the gears are shown at straight angles, angled teeth or helical teeth could be used, as well as any other geometry suitable for meshing engagement. FIG. 7 also shows spool collar 85 positioned about spool oscillator 64 and connected to thrust bearing 80. While described further in FIG. 8, the spool collar 85 in FIG. 7 includes radially inwardly extending pins that are designed to follow the slots in the spool oscillator 64 as it rotates. The spool collar 85 does not rotate when the spool oscillator is rotated, but rather oscillates axially, causing the spool hub and spool attached thereto to also oscillate axially. Thus, while the spool hub and spool oscillate and rotate, the spool collar, only oscillates, but does not rotate.

Figure 8:
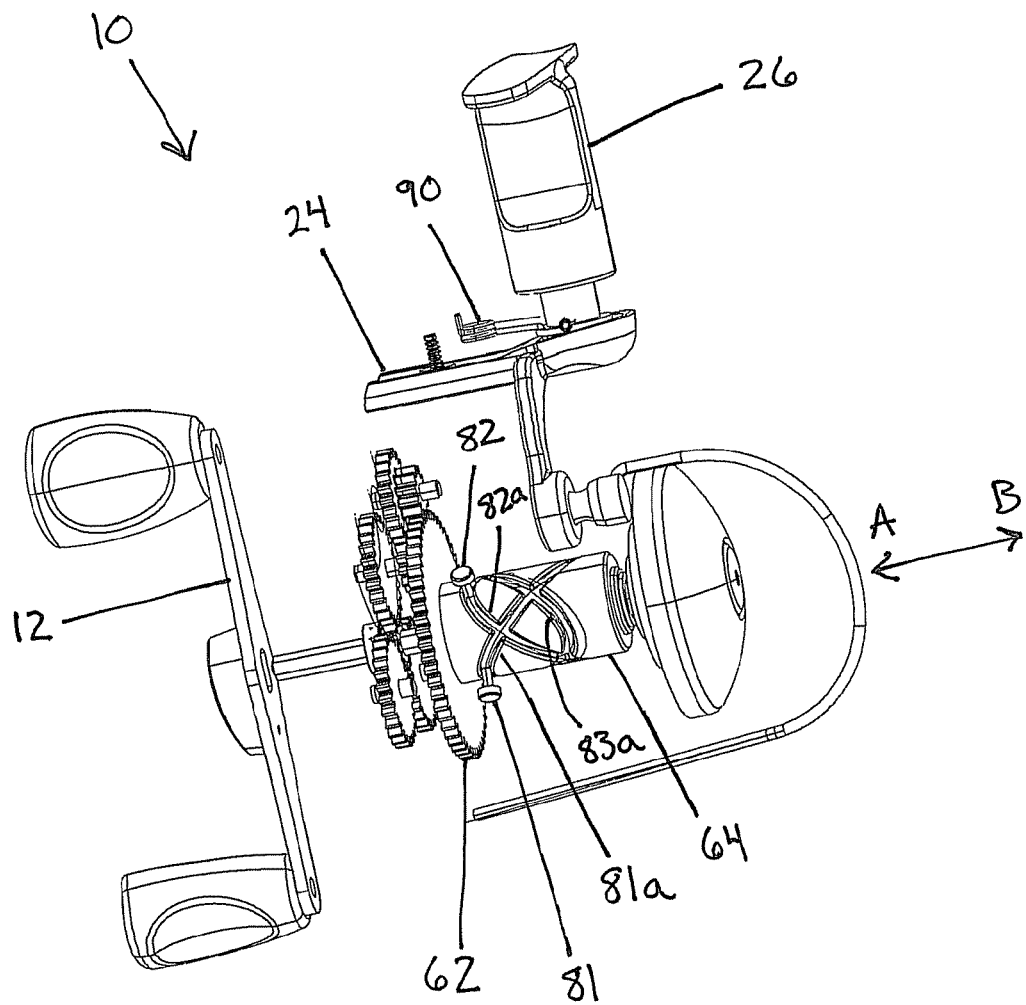
FIG. 8 is a perspective view of the fishing reel shown in FIGS. 4 and 5, with additional portions removed to show the internal mechanism used for pivoting the rod mount.

FIG. 8 shows another perspective view of fishing reel 10 from a different angle where the spool collar, spool hub, spool, reel frame, crank cover, and rear cover have been removed to reveal the internal mechanisms used to rotate and oscillate the spool. In addition, a portion of the reel frame arm 24 has been removed to show features relating to the pivoting of the rod mount 26 with respect to reel frame arm. In FIG. 8, spool oscillator 64 is shown with a first pin 81 engaged with and positioned in first elliptical slot 81a, as well as second pin 82 engaged with and positioned in second elliptical slot 82a. Elliptical slots 81a and 82a extend around the exterior surface of spool oscillator 64. Although not shown, in this embodiment there is also a third pin that is engaged with and positioned in a third elliptical slot 83a. The first pin 81, second pin 82, and third pin (not shown) are attached to the spool collar 85 (shown in FIG. 7) and extend radially inwardly from the spool hub. In operation, as the spool oscillator 64 is rotated, the radially inwardly extending pins connected to the spool hub follow the elliptical slots 81a, 82a, and 83a. As the pins follows the elliptical slots, they cause the spool collar, spool hub, and spool to oscillate out in a direction toward point B and again in, in a direction toward point A. Thus, while the spool oscillator 64 rotates, the pins that follow the elliptical pattern of slots 81a, 82a, and 83a serve to oscillate the spool hub (not shown) to which they are connected out and in and in out, in a back in forth or oscillatory manner. Preferably the slots are chamfered to allow for the pins to more easily follow the slots. Further, the walls of the slots are preferably each tapered at a ten degree angle to facilitate movement of the pins through the slots. The pins are preferably on the order of 0.06 inches in diameter with the slots slightly larger to accommodate movement of the pins through the slots. The pins are preferably made of stainless steel. Also, one of the slots may be deeper than the others. In a preferred embodiment there are three pins that ride in and follow three respective elliptical slots. However, a single pin and single slot could also be used. However, in a preferred embodiment, there are three pins used to provide stability to the oscillatory movement. In addition, while the slots are preferably elliptical, it is also possible to have slots of differing geometries that could be used, such as a sine wave, although elliptical slots are preferred. Furthermore, the pins are may be coplanar and spaced equidistantly from each other. However the pins do not need to be coplanar but could be axially spaced about the exterior surface of the spool oscillator in various places. In a preferred embodiment, two of the pins are coplanar, with the third pin being axially spaced apart from the other two pins. Further, the pins are not required to be spaced equidistantly along the exterior surface of the spool oscillator, and in fact are preferably unevenly spaced to insure that when one pin is at the intersection of two elliptical slots, the other pins are not in such an intersection. In a current preferred embodiment, the first pin is spaced 100 degrees from the second pin, and 138.5 degrees from the third pin.

FIG. 8 also shows fishing reel 10 with a portion of reel frame arm 24 removed to show the internal mechanism preferably used for pivotably rotating the rod mount 26 with respect to reel frame arm 24. In particular, a torsion spring 90 is shown that is positioned within reel frame arm 24. Rod mount 26 is shown in a first position wherein the rod mount is perpendicular to the spool oscillator 64 (as well as the spool hub and spool not shown).

Figure 9:
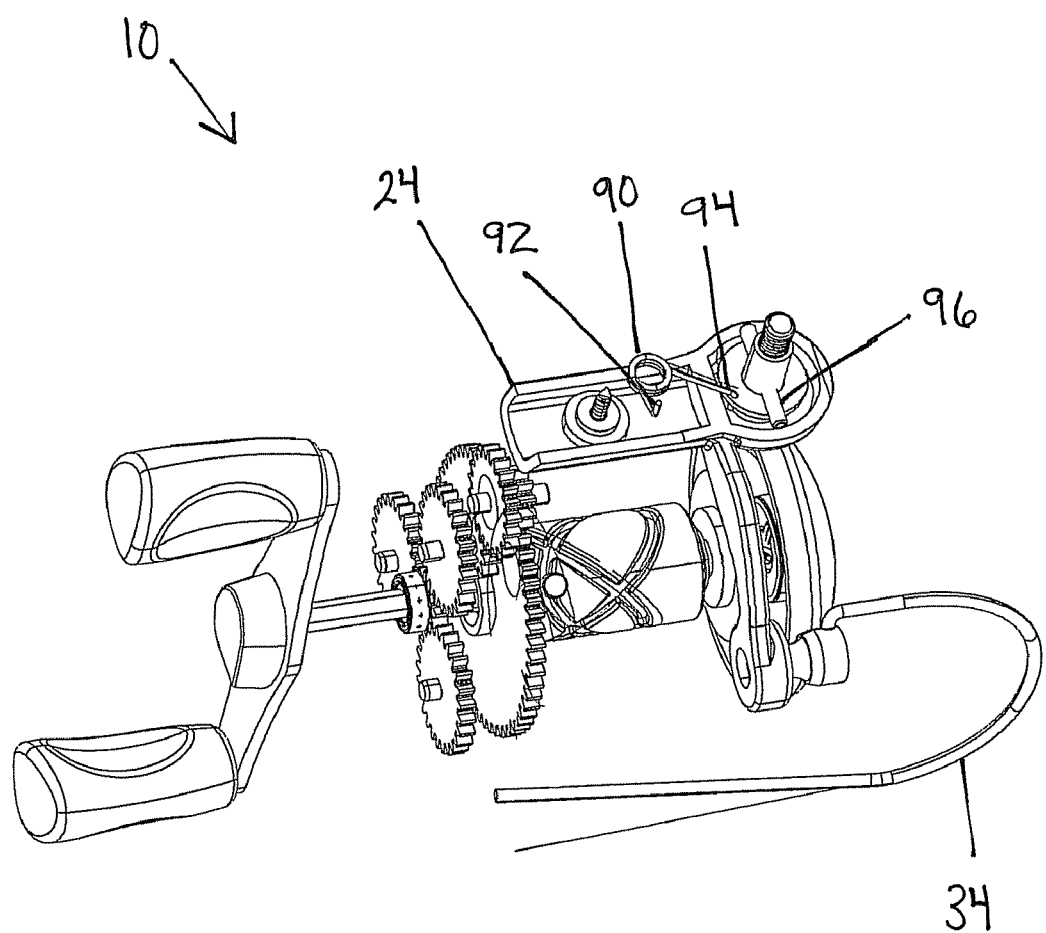
FIG. 9 is another perspective view of the fishing reel shown in FIG. 8.

FIG. 9 shows another view of fishing reel 10 shown in FIG. 8 with the rod mount removed. In this first position, the torsion spring 90 has a first end 92 that is connected to reel frame arm 24. The first end 92 has a bent portion that fits into an aperture of the reel frame arm 24 adapted to receive the bent portion of first end 92. At the same time, the second end 94 is connected to a pivoting member 96 positioned at the connection between the reel frame arm 24 and the rod mount. The second end 94 of torsion spring 90 also has a bent end that fits into an aperture of pivoting member 96. In this manner, the torsion spring 90 is held in place at the first end 92 and the second end 94, but the main coiled portion of torsion spring 90 is free to move as the pivoting member 96 rotates. In this first position, the torsion spring is in a less compressed state. As the rod mount is rotated 90 degrees into a second position, the torsion spring 90 undergoes compression. When the pivoting member 96 is moved 90 degrees into its second position, the torsion spring is once again in a less compressed state. The main coiled portion of torsion spring 90 is allowed to move within the reel frame arm 24 to allow the second end 94 to move from a point when the rod mount is in a first position to a point when the rod mount is in a second position. Thus the torsion spring 90 serves as an indexing mechanism to allow the rod mount to be in either its first or second position. While the torsion spring mechanism just described is the preferred mechanism for allowing the rod mount to pivot 90 degrees, the present invention envisions many other different mechanisms that could be used. For example, the rod mount could employ a depressible button that extends through an aperture in the rod mount or reel frame arm. When the button is depressed, the rod mount pivots 90 degrees until the button extends through a different aperture positioned 90 degrees from the first aperture. Alternatively, 90 degree indexing teeth could be used. Alternatively, a wave washer or wave washers could also be used to employ the desired 90 degree indexing.

Furthermore, when the rod mount is in the second position, the spool is essentially parallel to the rod mount (and the attached fishing pole). In this manner, given that the bail is in fixed relation to the reel frame (not shown), when the rod mount is in the second position, the bail operates in a manner similar to a spin casting reel when the bail is opened. Thus, when the rod mount is in its second position, fishing reel 10 may cast out the line in a manner similar to when the bail is opened on a conventional spin casting reel. In this configuration, when the rod mount is the second position, the fishing reel 10 is able to cast line further than a conventional bait casting reel because the spool is not required to rotate to spool off line. Thus, this embodiment includes the casting advantages typically associated with conventional spin casting reels.

Figure 10:
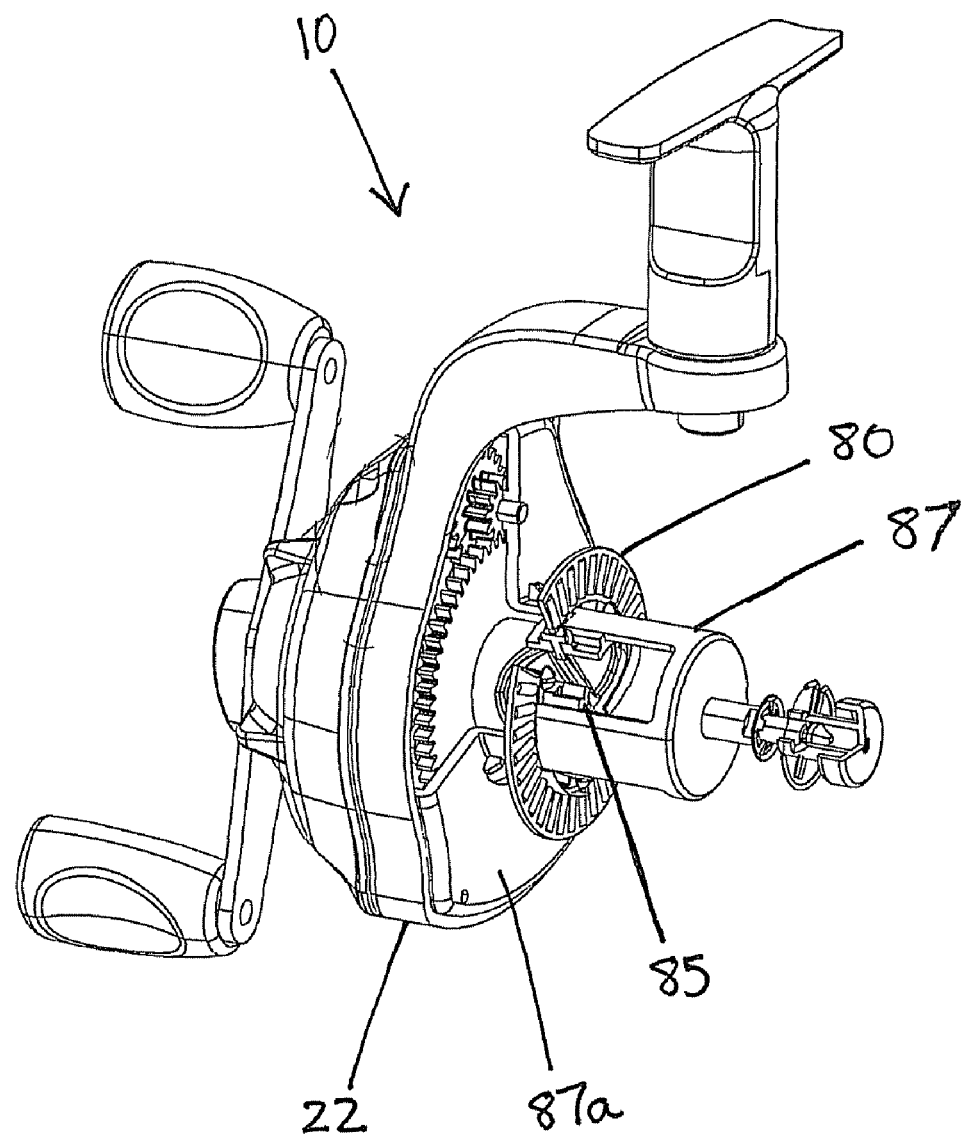
FIG. 10 is a perspective view of the fishing reel shown in FIG. 7 including a thrust bearing and a spool collar guide.

FIG. 10 shows fishing reel 10 with portions cutaway and removed to show the internal components. In particular, FIG. 10 shows spool collar 85 positioned within spool collar guide 87 that is attached to reel frame 22 by radial plate 87a of spool collar guide 87. The spool collar guide 87 does not rotate or oscillate and is connected to the reel frame 22. The spool collar 87 serves as a guide for the spool oscillator (not shown) as it axially oscillates within the spool collar guide 87.

Figure 11:
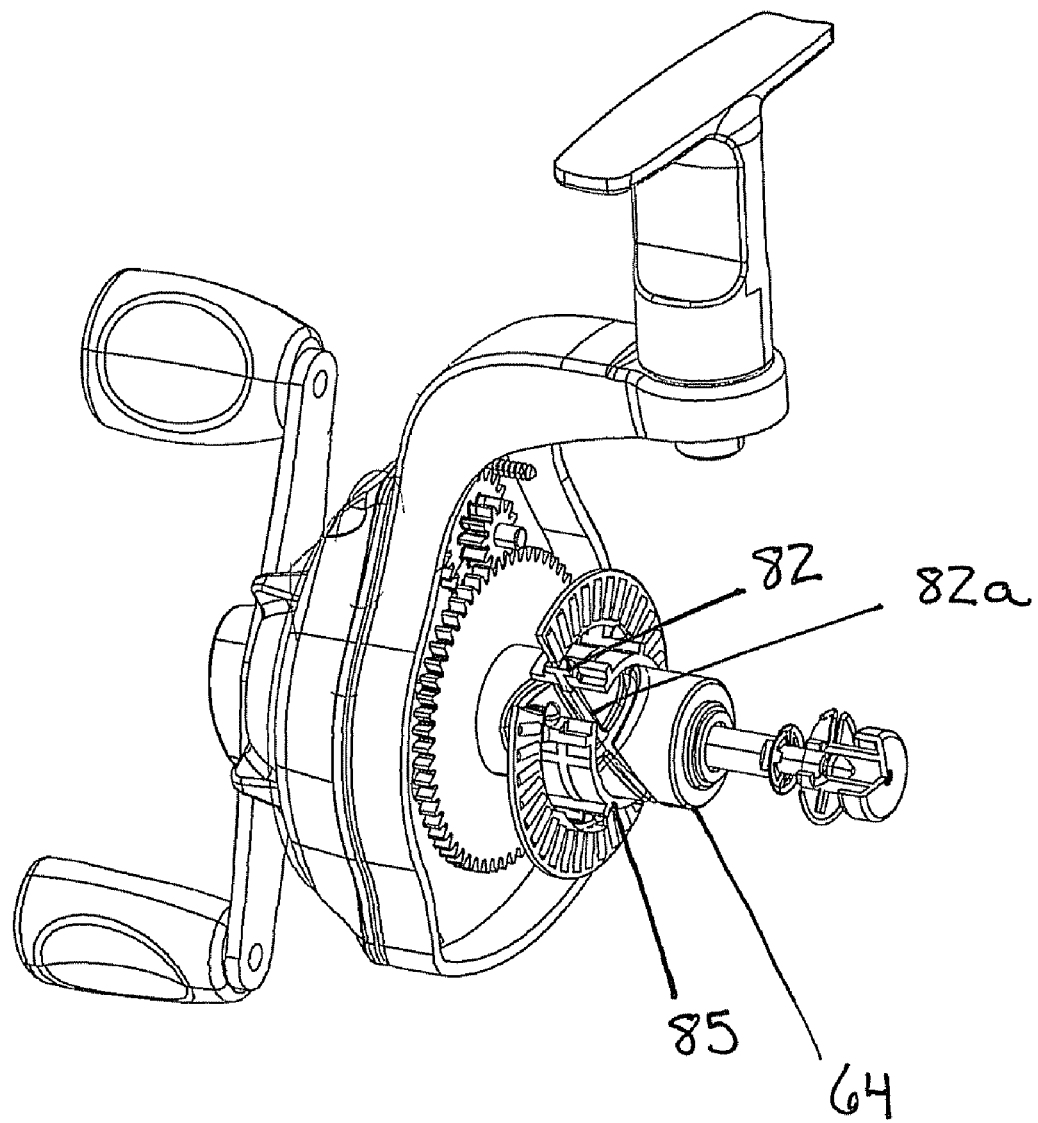
FIG. 11 is a perspective view of the fishing reel shown in FIG. 10 with the spool removed.

FIG. 11 shows the fishing reel of FIG. 10 with the spool collar guide removed. Spool oscillator 85 is shown moving along spool oscillator 64 with pin 82 positioned in and following elliptical slot 82a.

Figure 12:
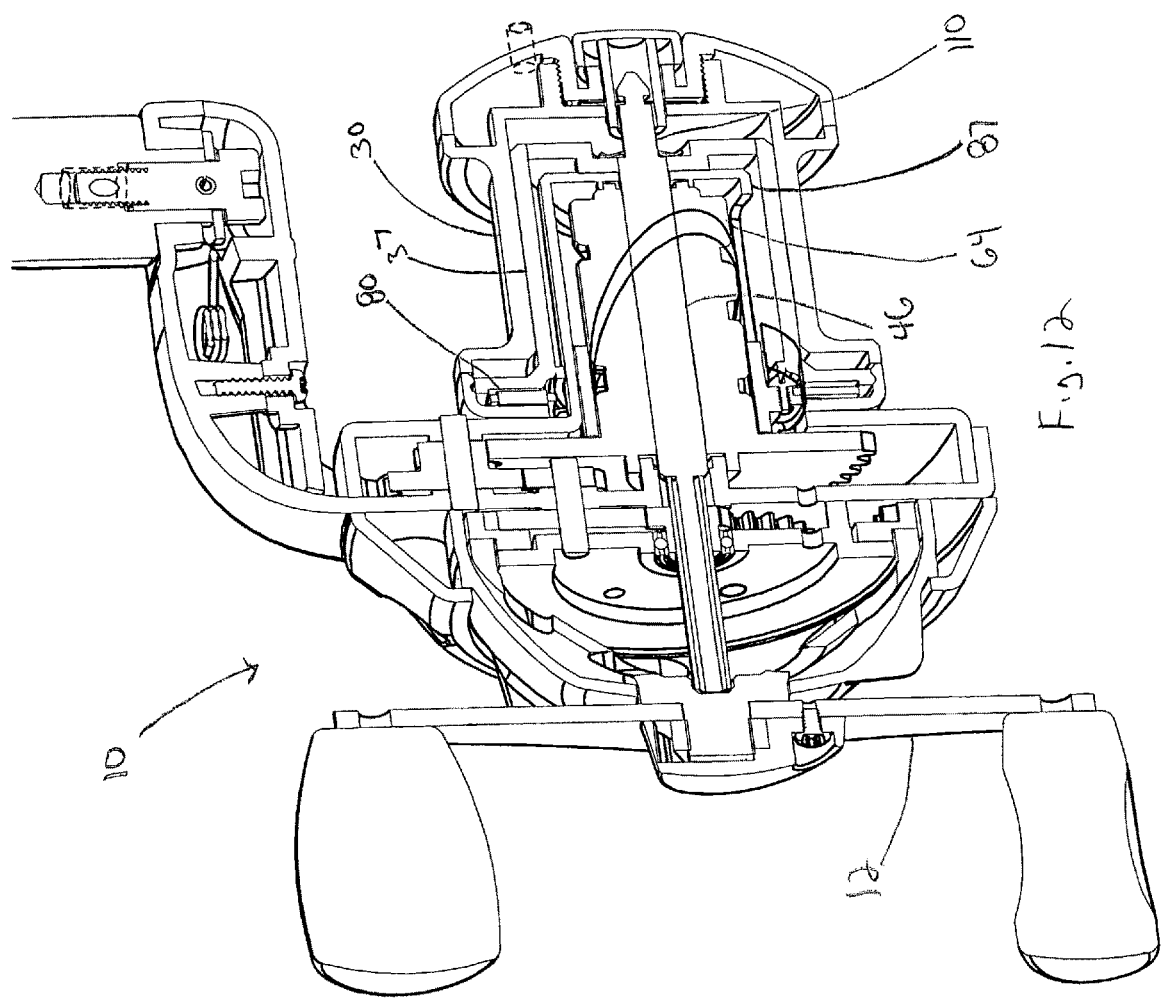
FIG. 12 is a cutaway view of the fishing reel shown in FIGS. 10 and 11.

FIG. 12 is a cutaway view of fishing reel 10, showing spool 30 positioned about spool hub 37 and spool collar 87, which is positioned about spool oscillator 64. Also shown is thrust bearing 80 and spool shaft 46 extending from handle crank 12 to a second end 110 of the spool shaft where it connects with the spool hub and spool. Preferably the second end 110 of the spool shaft 46 includes a double D cross-section to provide flats to impart rotational motion to the spool hub 37 and spool 30.

It should be noted that the above discussed embodiments are shown with a pivotable rod mount and a non-rotating bail. However, it is contemplated that the above described embodiments could also be used with a fixed, non-rotating rod mount using the same mechanisms to both rotate and oscillate the spool. Under this alternate embodiment, it may be appropriate to use a pivotable bail.

Figure 13:
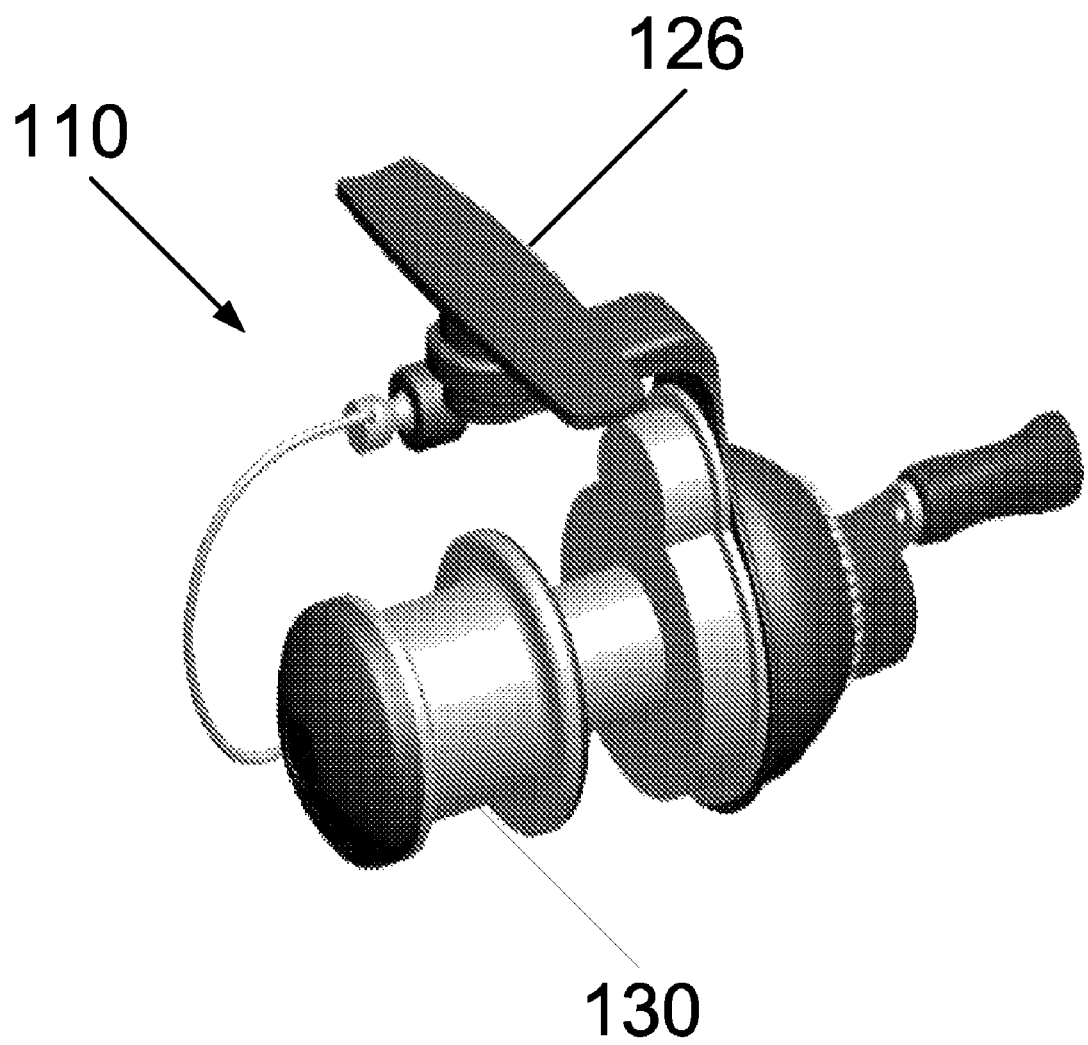
FIG. 13 is a perspective view of an alternate embodiment of a fishing reel with the rod mount in a first position.
Figure 14:
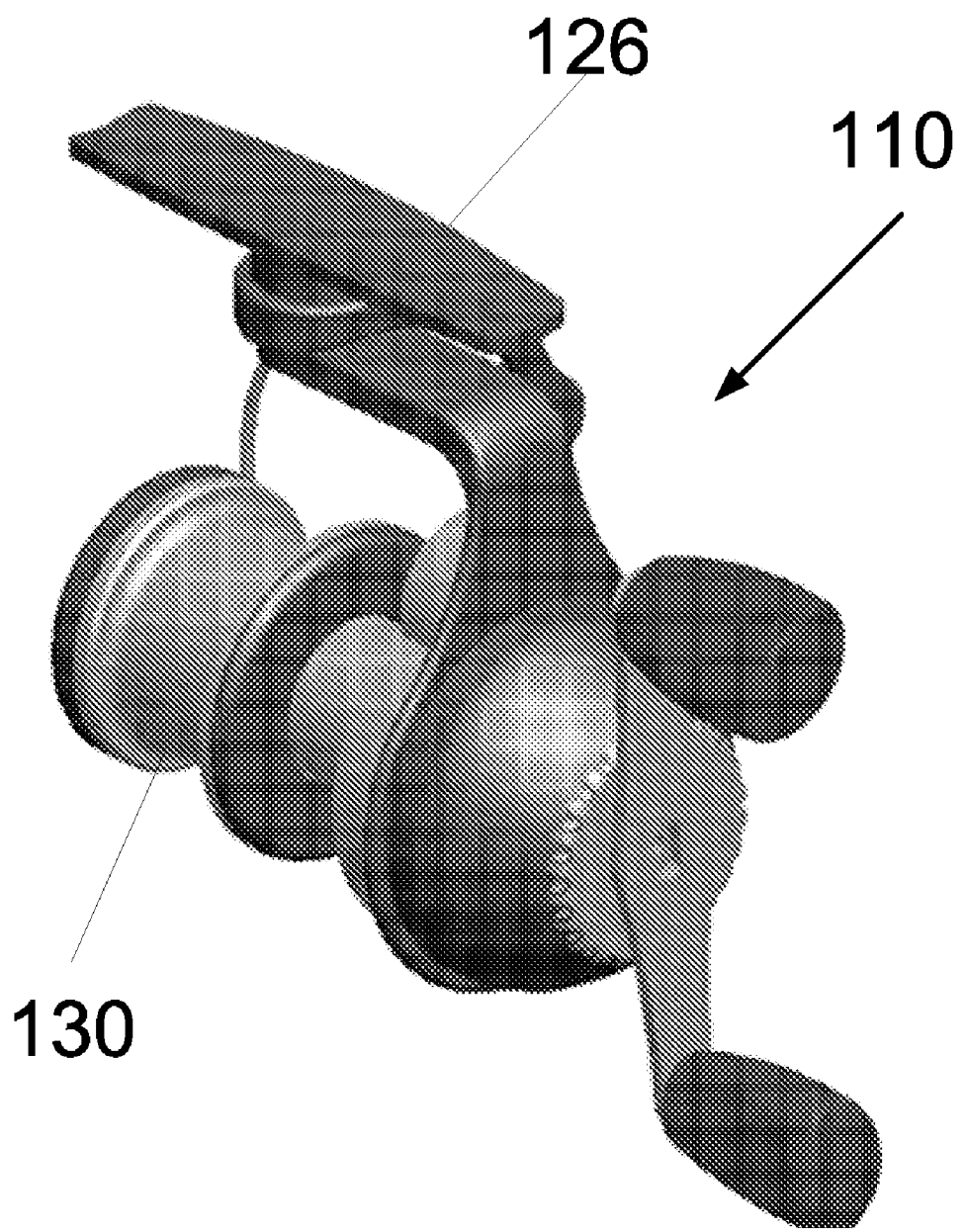
FIG. 14 is a perspective view of the fishing reel of FIG. 13 with the rod mount pivoted 90 degrees to a second position.

FIG. 13 shows an additional alternate embodiment of fishing reel 110 with rod mount 126 shown in a first position generally perpendicular to spool 130. In this Figure, it can be seen that spool 130 has been oscillated to an axially extended position. FIG. 14 shows fishing reel 110 where the rod mount 126 has been pivoted 90 degrees from its first position into a second position that is generally parallel to spool 130.

Figure 15:
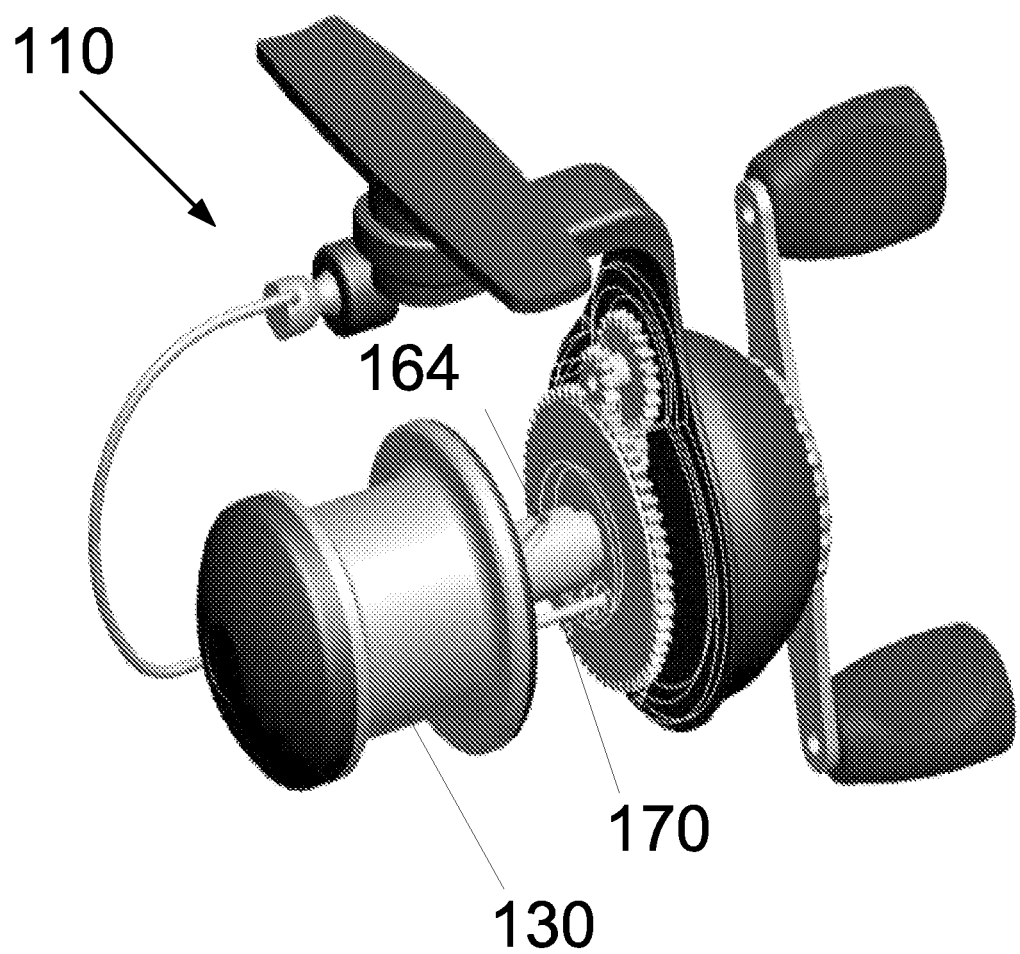
FIG. 15 is a perspective view of the fishing reel shown in FIG. 13 with portions removed to show the internal mechanisms.

FIG. 15 shows the fishing reel 110 with spool 130 shown in an axially extended position, where spool oscillator 164 is shown and where spool oscillator rod guide 170 is shown, which is an alternate method of guiding a spool collar during oscillation.

The claims should not be read as limited to the elements specifically described unless stated to that effect. Therefore, all embodiments that come within the scope and spirit of the following claims and equivalents thereto are claimed as the invention.

What is claimed is:

1. A fishing reel comprising:
a reel frame;
a spool shaft extending through the reel frame;
a handle crank attached to a first end of the spool shaft;
a non-rotating spool collar positioned about the spool shaft;
a spool positioned about the spool collar that rotates around the spool collar when the handle crank is rotated;
an end of the spool is connected to a second end of the spool shaft;
a non-rotating bail connected to the reel frame;
a line guide positioned on or adjacent to the non-rotating bail and positioned radially outwardly from the spool;
a rod mount connected to the reel frame pivotable 90 degrees from a first position with respect to the reel frame to a second position;
wherein when the rod mount is in the first position, the spool is generally perpendicular to the rod mount, and when the handle crank is rotated, the spool oscillates in and out with respect to the reel frame and the spool rotates about the spool collar in a manner such that fishing line positioned on the line guide is spooled onto the spool in a back and forth manner to spool the fishing line across a length of the spool when the fishing line is being reeled in;
and wherein when the rod mount is in the second position, the spool is generally parallel to the rod mount to allow line to be cast out from the spool.

2. The fishing reel of claim 1, further including a planetary gear assembly including a ring gear with inwardly facing teeth that is rotated when the handle crank is rotated;
a first planet gear, a second planet gear, and third planet gear that are each positioned radially inwardly from the ring gear with each planet gear having outwardly extending teeth that mesh with the teeth of the ring gear such that the first, second, and third planet gears are caused to rotate when the ring gear is rotated;
a sun gear positioned radially inwardly from each of the planetary gears and having outwardly extending teeth that mesh with the teeth of the planet gears such that the sun gear is caused to rotate when the planet gears are rotated;
an auxiliary gear having outwardly extending teeth that is connected to the first planet gear and positioned axially outwardly from the first planet gear such that the auxiliary gear rotates when the first planet gear is rotated;
a compound gear positioned radially outwardly from the auxiliary gear having a first set of outwardly extending teeth that mesh with the teeth of the auxiliary gear such that the compound gear is caused to rotate when the auxiliary gear rotates;
the compound gear further including a second set of outwardly extending teeth positioned axially outwardly from the first set of teeth, wherein the first set of teeth and the second set of teeth rotate together when the compound gear is rotated;
a spool hub gear positioned radially inwardly from the second set of teeth of the compound gear and having outwardly extending teeth that mesh with the second set of teeth of the compound gear such that the spool hub gear is caused to rotate when the compound gear is rotated;
a spool oscillator fixedly connected to the spool hub gear and positioned axially outwardly from the spool hub gear, and wherein the spool oscillator is positioned within the spool; wherein the spool oscillator includes a first elliptical slot positioned on an exterior surface of the spool oscillator;
a first pin extending radially inwardly from and connected to the spool collar that is adapted to engage and fit within the first elliptical slot, such that when the spool oscillator is rotated, the first pin follows the first slot causing the spool collar to oscillate axially.

3. The fishing reel of claim 2, wherein the spool oscillator further includes second and third elliptical slots positioned on the exterior surface of the spool oscillator; and a second pin and a third pin extending radially inwardly from and connected to a spool hub that are adapted to engage and fit within the second and third elliptical slots respectively, such that when the spool oscillator is rotated, the second pin follows the second slot, and the third pin follows the third slot causing the spool hub to oscillate axially.

4. The fishing reel of claim 3, wherein the first, second, and third elliptical slots are evenly spaced on the exterior surface of the spool oscillator.

5. The fishing reel of claim 3, wherein the first, second, and third pins are not evenly spaced.

6. The fishing reel of claim 3, wherein the first, second, and third pins, are coplanar.

7. The fishing reel of claim 2, wherein the spool shaft extends through the sun gear, the spool hub gear, and the spool oscillator, but is not directly connected to any of them.

8. The fishing reel of claim 2, wherein the reel frame is positioned between the first planet gear and the auxiliary gear and the compound gear, and wherein a dowel pin extends through the reel frame connecting the first planet gear to the auxiliary gear.

9. The fishing reel of claim 2, further including a rear cover attached to the reel frame and a crank cover positioned about the spool shaft and positioned between the handle crank and the rear cover.

10. The fishing reel of claim 1, wherein the spool is positioned about and removable from a spool hub.

11. The fishing reel of claim 10, including a thrust bearing positioned radially outwardly from the spool hub and radially outwardly from the reel frame and radially inwardly from the spool.

12. The fishing reel of claim 1, wherein the handle crank includes two oppositely disposed paddles.

13. The fishing reel of claim 1, further including a reel frame arm extending outwardly from the reel frame.

14. The fishing reel of claim 13, wherein the rod mount is pivotably connected to the reel frame arm.

15. The fishing reel of claim 14, wherein a torsion spring is positioned within the reel frame aim and a first end of the torsion spring is connected to the reel frame arm, and a second end of the torsion spring is interconnected to the rod mount.

16. The fishing reel of claim 15, wherein when the mount is in the first position, the second end of the torsion spring is in a first less compressed state, and when the rod mount is rotated towards the second position, the spring goes through a compressed state, and when the rod mount is in the second position, the second end of the torsion spring is in a second less compressed state.

17. The fishing reel of claim 1, further including a bail arm extending inwardly from the reel frame arm.

18. The fishing reel of claim 17 wherein a first end of the bail is connected to an end of the bail arm and a second end of the bail is connected to the reel frame.

19. The fishing reel of claim 1, further including a planetary gear assembly that transmits rotational force to a spool hub gear that is connected to a spool oscillator.

20. The fishing reel of claim 19, wherein the spool oscillator further includes first, second and third elliptical slots positioned on an exterior surface of the spool oscillator; and a first pin, second pin, and a third pin extending radially inwardly from and connected to a spool hub that are adapted to engage and fit within the first, second and third elliptical slots respectively, such that when the spool oscillator is rotated, the first pin follows the first slot, the second pin follows the second slot, and the third pin follows the third slot causing the spool hub to oscillate axially outwardly and inwardly.

21. A fishing reel comprising:
a reel frame;
a spool shaft extending through the reel frame;
a handle crank attached to a first end of the spool shaft;
a non-rotating spool collar positioned about the spool shaft;
a spool positioned about the spool collar that is connected to a second end of the spool shaft, and that rotates around the spool collar when the handle crank is rotated;
a non-rotating bail connected to the reel frame;
a line guide positioned on or adjacent to the non-rotating bail and positioned above the spool;
a rod mount connected to the reel frame pivotable 90 degrees from a first position with respect to the reel frame to a second position;
wherein when the rod mount is in the first position, the spool is generally perpendicular to the rod mount, and when the handle crank is rotated, there are means for causing the spool to oscillate in and out with respect to the reel frame and there are means for causing the spool to rotate about the spool collar in manner such that fishing line positioned on the line guide is spooled onto the spool in a back and forth manner to spool the fishing line across a length of the spool when the fishing line is being reeled in;
and wherein when the rod mount is in the second position, the spool is generally parallel to the rod mount to allow line to be cast out from the spool.

22. A fishing reel comprising:
a reel frame;
a spool shaft extending through the reel frame;
a handle crank attached to a first end of the spool shaft;
a non-rotating spool collar positioned about the spool shaft;
a spool positioned about the spool collar that is connected to a second end of the spool shaft, and that rotates around the spool collar when the handle crank is rotated;
wherein when the handle crank is rotated, the spool is rotated about the spool collar, and the spool collar is caused to oscillate axially in turn causing the spool to oscillate.

23. The fishing reel of claim 22, further including a rod mount connected to the reel frame pivotable 90 degrees from a first position with respect to the reel frame to a second position;
wherein when the rod mount is in the first position, the spool is generally perpendicular to the rod mount, and when the handle crank is rotated, the spool rotates about the spool collar and also oscillates axially with respect to the reel frame such that fishing line may be spooled onto the spool in a back and forth manner to spool the fishing line across a length of the spool when the fishing line is being reeled in;
and wherein when the rod mount is in the second position, the spool is generally parallel to the rod mount to allow line to be cast out from the spool.

24. The fishing reel of claim 22, further including a pivoting bail.

* * * * *